(12) United States Patent
Kondo et al.

(10) Patent No.: US 11,011,185 B2
(45) Date of Patent: May 18, 2021

(54) PROCESSING DEVICE, PROCESSING METHOD, AND STORAGE MEDIUM

(71) Applicant: NEC Corporation, Tokyo (JP)

(72) Inventors: Reishi Kondo, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/309,529

(22) PCT Filed: Jun. 21, 2017

(86) PCT No.: PCT/JP2017/022814
§ 371 (c)(1),
(2) Date: Dec. 13, 2018

(87) PCT Pub. No.: WO2017/221968
PCT Pub. Date: Dec. 28, 2017

(65) Prior Publication Data
US 2019/0251989 A1    Aug. 15, 2019

(30) Foreign Application Priority Data

Jun. 22, 2016  (JP) .............. JP2016-123771

(51) Int. Cl.
*H04R 29/00*    (2006.01)
*G10L 25/51*    (2013.01)
(Continued)

(52) U.S. Cl.
CPC .............. *G10L 25/51* (2013.01); *G04G 5/04* (2013.01); *G04G 7/00* (2013.01); *G11B 20/10* (2013.01);
(Continued)

(58) Field of Classification Search
CPC .............. G10L 25/51; G11B 20/10527; G11B 20/10537; G11B 2020/10546;
(Continued)

(56) References Cited

U.S. PATENT DOCUMENTS 7,693,288 B2 * 4/2010 Mergler ................. G08C 19/28
381/105
2012/0170760 A1 * 7/2012 Virolainen ............ G10L 19/008
381/56
(Continued)

FOREIGN PATENT DOCUMENTS

JP    2000162346 A    6/2000
JP    2000251399 A    9/2000
(Continued)

OTHER PUBLICATIONS

International Search Report, dated Aug. 22, 2017 from the International Bureau in counterpart International application No. PCT/JP2017/022814.
(Continued)

*Primary Examiner* — Disler Paul

(57) ABSTRACT

Provided is a processing device capable of, on the basis of data prepared by a recorder that only has recording function, acquiring information related to a time when the data was prepared. The processing device includes an acquisition unit for acquiring the recorded audio data, and an identification unit for detecting a sound signal that is included in the audio data and transmitted from an information transmission device and allows the time at which the signal was recorded to be identified, and identifying the time when other signals included in the audio data were recorded on the basis of the sound signal.

17 Claims, 13 Drawing Sheets

(51) Int. Cl.
  *G04G 7/00* (2006.01)
  *G04G 5/04* (2006.01)
  *G11B 20/10* (2006.01)
(52) U.S. Cl.
  CPC .............. *G11B 20/10527* (2013.01); *G11B 2020/10546* (2013.01)
(58) Field of Classification Search
  CPC .... H04R 29/00; H04R 29/001; H04R 29/004; H04R 29/005
  USPC .................................. 381/56–57, 110, 91–92
  See application file for complete search history.

(56) References Cited

U.S. PATENT DOCUMENTS

| 2012/0219156 | A1* | 8/2012 | Ramaswamy | H04H 60/58 |
| | | | | 381/56 |
| 2015/0146879 | A1* | 5/2015 | Nguyen | H04N 21/43615 |
| | | | | 381/74 |
| 2016/0155455 | A1* | 6/2016 | Ojanpera | G10L 25/81 |
| | | | | 381/56 |
| 2016/0182997 | A1* | 6/2016 | Wilson | H04R 1/406 |
| | | | | 381/92 |
| 2019/0086508 | A1* | 3/2019 | Isberg | H04W 64/006 |

FOREIGN PATENT DOCUMENTS

| JP | 2003234726 A | 8/2003 |
| JP | 2008015469 A | 1/2008 |
| JP | 2010108296 A | 5/2010 |
| JP | 2013101284 A | 5/2013 |
| JP | 2014186112 A | 10/2014 |

OTHER PUBLICATIONS

Hoshuyama, O., "Sampling Synchronization Using Radio Broadcast Signals for Distributed Microphone Arrays", Technical Report of IEICE (The Institute of Electronics, Information and Communication Engineers), May 2015, vol. 114, No. 474, pp. 313-316 (6 pages).

Ohishi, Y., "Toward detection and discrimination of all sounds—present and future of audio event detection—", The Acoustical Society of Japan Proceedings, Acoustical Society of Japan, 2014, pp. 1521-1524 (4 pages).

Koshinaka, T., et al., "Sound and Audio Analysis Technique and Application to Public Solution", NEC Technical Journal, NEC Corporation, Nov. 2014, vol. 67, No. 1, pp. 86-89 (5 pages).

* cited by examiner

PROCESSING DEVICE, PROCESSING METHOD, AND STORAGE MEDIUM

This application is a National Stage Entry of PCT/JP2017/022814 filed on Jun. 21, 2017, which claims priority from Japanese Patent Application 2016-123771 filed on Jun. 22, 2016, the contents of all of which are incorporated herein by reference, in their entirety.

TECHNICAL FIELD

The present disclosure relates to a technique for analyzing a sound, and synchronizing time of a plurality of data.

BACKGROUND ART

A technique for analyzing sound such as environmental sound, voice and the like, and detecting an event occurred on the basis of characteristics of the sound is known. The sound representing the event occurred is sometimes called an audio event, an audio incident or the like. A technique for preliminarily defining an audio event and, from among collected sound data, detecting and identifying the audio event signifying the same characteristics as a defined audio event is called audio event detection.

For example, a technique for arranging a plurality of audio sensors (in other words, microphones) in a distributed manner, and detecting an audio event in the area in which the sensors are arranged is known. As a related technique, NPL 1 discloses a technique for precisely synchronizing using the same radio broadcast signals in order to synchronize the sampling of the plurality of microphones arranged in a wide area.

In addition, PTL 1 is a literature disclosing a synchronization of internal time of a plurality of recorders. When synchronizing, the recorders are connected to one another, and the time is set using a dedicated circuit.

PTL 2 discloses a technique for including information signifying a starting point of the watermark information (i.e., a synchronizing point) in sound data.

PTL 3 discloses a technique, which is not related to an analysis of sound, for adjusting delay difference of the two transmission lines using a frame identification signal. PTL 4 discloses a technique for setting the time through receiving an electric wave including time information.

CITATION LIST

Patent Literature

[PTL 1] Unexamined Japanese Patent Application Publication No. 2000-251399
[PTL 2] Unexamined Japanese Patent Application Publication No. 2013-101284
[PTL 3] Unexamined Japanese Patent Application Publication No. 2003-234726
[PTL 4] Unexamined Japanese Patent Application Publication No. 2000-162346

Non Patent Literature

[NPL 1] "Sampling Synchronization Using Radio Broadcast Signals for Distributed Microphone Arrays", HOSHUYAMA Osamu, Technical report of IEICE (The Institute of Electronics, Information and Communication Engineers), IEICE, May 2015, vol. 114, No. 474, pp. 313-316.

SUMMARY OF INVENTION

Technical Problem

When an audio event is detected from audio data recorded by a recorder (hereinafter referred to as audio data) as the techniques disclosed in PTL 1 and NPL 1, the occurrence time of the audio event can be identified if the time information is related to the audio data.

However, equipping the recorder with a function for relating accurate time information with the audio data takes a certain level of cost. For example, the recorder of PTL 1 needs to be equipped with a dedicated circuit for synchronization. With the technique disclosed in NPL 1, installation of an antenna for receiving radio signal is necessary, and there is a limitation in the equipment configuration, and, large computer resource is necessary.

When a function for relating the time information with the audio data is not provided, and especially, when the recorder does not incorporate a clock or does not have a function to calibrate the clock, it is difficult to correctly identify the occurrence time of the audio event. In addition, in such a case, measuring ambient sound using a plurality of recorders and relating audio events included in the audio data collected by each recorder to one another is difficult. In other words, recorders that do not have a configuration dedicated for synchronization and time adjustment do not contribute to identification of the same audio event recorded to a plurality of recorders.

One of the objectives of the present invention is to provide a processing device that can acquire, on the basis of data generated by a recorder having only a recording function, information related to the time at which the data is generated.

Solution to Problem

A processing device according to one aspect of the present invention includes an acquisition means for acquiring recorded audio data, and an identification means for detecting a signal of a sound included in the audio data, the signal being emitted from an information emission device and enabling identification of time at which the signal is recorded, and on the basis of the signal, identifying time at which another signal included in the audio data is recorded.

A processing method according to one aspect of the present invention acquires recorded audio data, detects a signal, the signal being included in the audio data and enabling identification of time at which the signal is recorded, and on the basis of the signal, identifies time at which another signal included in the audio data is recorded.

A program according to one aspect of the present invention causes a computer to execute an acquiring process for acquiring recorded audio data, and an identification process for detecting a signal, the signal being included in the audio data and enabling identification of time at which the signal is recorded, and an identifying process for identifying, on the basis of the signal, time at which another signal included in the audio data is recorded.

Advantageous Effects of Invention

According to the present invention, on the basis of data generated by a recorder having only a recording function, information related to time the data are generated can be acquired.

EXAMPLE EMBODIMENT

Hereinafter, example embodiments of the present invention will be described with reference to figures.

First Example Embodiment

A first example embodiment of the present invention is described.
<Configuration>

Figure 1:
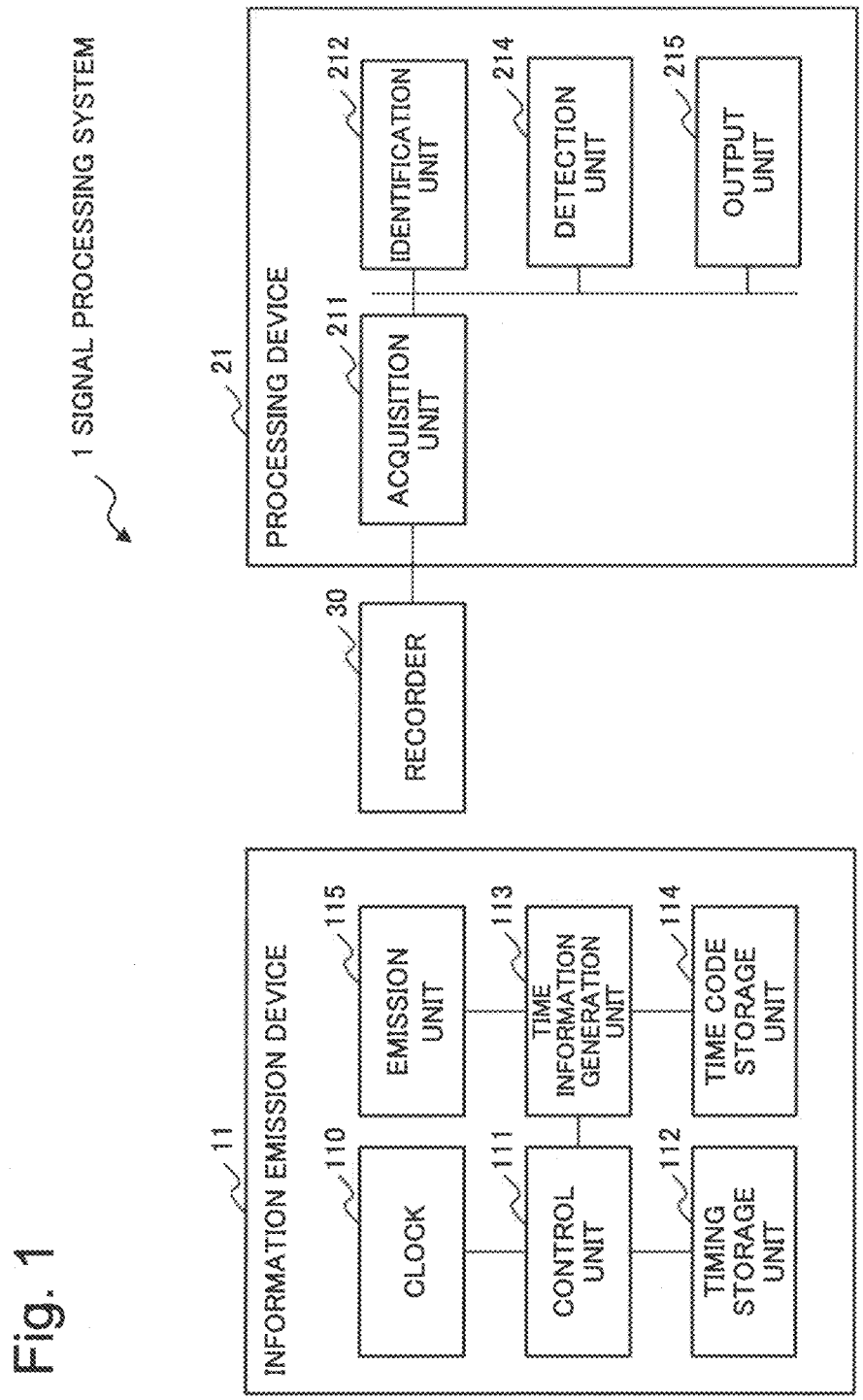
FIG. 1 is a block diagram illustrating a configuration of a signal processing system according to the first example embodiment of the present invention.

FIG. 1 is a block diagram illustrating an overall configuration of an information emission device and a signal processing system 1 to which the information emission device and the processing device according to the first example embodiment are employed.

The signal processing system 1 includes an information emission device 11, a processing device 21, and a recorder 30.

===Recorder 30===

The recorder 30 is installed at a place where a user wants to collect audio events, and collects ambient sound. The recorder 30 records the audio signal input to an incorporated microphone in a recordable area as time series data of a sound, for example. The recorder 30 may be a machine that records a sound in analog format such as an analog tape recorder. Hereinafter, processing of collecting of the ambient sound and generating data of the collected ambient sound performed by the recorder 30 is referred to as "recording". Hereinafter, the data generated by the recorder 30 by recording is referred to as "audio data".

The recorder 30 may not necessarily be synchronized with some standard time system. However, the recorder 30 records a sound in time order in a predetermined constant recording speed. For example, when the recording method of the recorder 30 is digital recording, the recorder 30 acquires and records an amplitude of the sound wave at a predetermined time interval. When the recording method of the recorder 30 is analog recording, the recorder 30 fixes (records) a sound on a tape that moves in a predetermined speed. As a result, an audio signal in the generated audio data and the elapsed time from the time at which the recording started can be related to each other. In other words, the time at which the signal in the audio data is recorded can be relatively identified using the starting time of the audio data as a point of reference, for example.

The recorder 30 may have an internal storage area, or may be communicatively connected to a storage device. When the recorder 30 is communicatively connected to a storage device, the recorder 30 may record audio data on the storage device. The recorder 30 may send audio data to the processing device 21.

===Information Emission Device 11===

The information emission device 11 includes a clock 110, a control unit 111, a timing storage unit 112, a time information generation unit 113, a time code storage unit 114, and an emission unit 115.

The clock 110 provides time to the control unit 111. The time provided by the clock 110 is, for example, the standard time of the country in which the signal processing system 1 is implemented. The clock 110 may synchronize at any time with an accurate external time source using GPS (Global Positioning System) or the like in order to acquire the accurate standard time. The time provided by the clock 110 may be set by a person.

Precision of the clock 110 may not be rigorous. The time provided by the clock 110 may be the time proper enough for the system to achieve the objective. For example, it may be permissive if the maximum value of the error of clocking by the clock 110 may be 0.5 second per week.

The clock 110 outputs the information signifying the time that is being clocked, using a crystal oscillator for example, at fixed time periods to the control unit 111.

The timing storage unit 112 stores information that specifies the timing that the emission unit 115 emits time information. The time information will be described later. The information specifying the timing is preliminarily set by the user for example. For example, 0:00, 7:00, 12:30, 18:00, and 21:00 are set as the timing for emitting the time information, and the time that is set is stored in the timing storage unit 112.

The set timing may be stored in a format such as "0 minutes 00 seconds every hour". In addition, when the recording of the sound is continued over a plurality of days, different times may be set for each day.

The control unit 111 watches the time provided by the clock 110. The control unit 111 calls the time information generation unit 113 when the time provided by the clock 110 matches the time signified by the timing storage unit 112. The control unit 111 may send, to the time information generation unit 113, information signifying the time provided by the clock 110 that matches the time signified by the timing storage unit 112.

The time information generation unit 113 generates time information. Time information is the information signifying the time, and is information that may be signified by a sound.

Time information includes, for example, information signifying that the information itself is time information, and information signifying time. Hereinafter, the information signifying that the information is the time information is referred to as "indication information". The information signifying the time is referred to as "time code". The indication information and the time code may not be separate, and may be represented by one signal.

The indication information may include a characteristic that enables identification unit 212 of the processing device 21, which will be described below, to detect that the time information is signified. For example, the indication information may include frequency, volume, and other characteristics that are not usually detected from the ambient sound recorded by the recorder 30.

The time code is, for example, information of the time that is converted to information having the form of a sound. The time information generation unit 113 may convert the time information received from the control unit 111, or use a preliminarily prepared time code. For example, the time code storage unit 114 may store the time code, and the time information generation unit 113 may receive the time code.

There are various known methods for converting the time information into audio. For example, the time code may be generated by the method of translating information into audio, used by a modem and an acoustic coupler. The time code may be time information or the like that is embedded in the audio using an audio watermarking technique. The time code may be represented by a time series pattern of audio such as Morse code, or may be represented by the number of times of appearance of the audio as seen in the cuckoo clock. In addition, the time code may not represent the time itself. For example, the time information may be encoded using a rule such as 0.5 seconds of 2000 Hz audio wave represents seven o'clock. Therefore, the time information generation unit 113 may indirectly express the time using the signal preliminarily defined for the time information generation unit 113 and the processing device 21.

The emission unit 115 is a speaker, for example. The emission unit 115 converts the time information generated by the time information generation unit 113 to sound which is the vibration of the air, and emits the sound.

The emission unit 115 is arranged at a position where the sound emitted by the emission unit 115 is acquired by the recorder 30.

With the configuration described above, the sound by which the time can be identified is recorded on the recorder 30. In other words, the audio data including the time information are generated by the recorder 30.

When there is a time lag that cannot be ignored between the time at which the control unit 111 calls the time information generation unit 113 and the time at which the time information is emitted by the emission unit 115, a measure to adjust the time lag may be taken. For example, the control unit 111 may call the time information generation unit 113 when the time difference between the time shown by the clock 110 and the time shown by the timing storage unit 112 becomes less than a predetermined value. Alternatively, for example, the time information generation unit 113 may add a time in which the time lag is taken into consideration to the received time, and convert a resulting time to a time code.

===Processing Device 21===

The control structure of the processing device 21 will be described.

The processing device 21 includes an acquisition unit 211, an identification unit 212, a detection unit 214 and an output unit 215.

The acquisition unit 211 acquires audio data from the recorder 30. For example, when the audio data are recorded in an internal storage medium of the recorder 30, a person attaches the storage medium to the acquisition unit 211, and the acquisition unit 211 reads the audio data. In such a case, the acquisition unit 211 is, for example, a drive that can read the information recorded on the storage medium. The acquisition unit 211 may receive the audio data by communicating with the recorder 30 or a storage medium on which the audio data are recorded. In such a case, the acquisition unit 211 is a communication interface for example. The audio data may not necessarily be acquired in real time.

The acquisition unit 211 transmits the acquired data to the identification unit 212.

The identification unit 212 identifies the time at which the audio data are recorded on the basis of the time information included in the audio data. Specifically, the identification unit 212 performs the following process, for example.

Firstly, the identification unit 212 detects the time information included in the audio data. The identification unit 212 may firstly detect the indication information from the audio data, and then detect the time code on the basis of the indication information.

The identification unit 212 detects the indication information by searching for the indication information included in the audio data. When the frequency in which the characteristic of the indication information appears is known, a frequency component at that frequency of the audio data may be searched. The identification unit 212 identifies the time code through detecting the indication information.

The identification unit 212 decodes the time code. A decoding method of the time code may be preliminarily determined in such a way as not to conflict with the time information generation unit 113 (or the time code storage unit 114) which generates the time code. The identification unit 212 acquires the time information signified by the time code by decoding the time code. Since the time signified by the time code is the time at which the time information including the time code is emitted, the identification unit 212 is able to identify the time at which the time information is emitted by decoding the time code. For example, when the time code is set on the information emission device 11 side so as to signify the time at which the indication information started to ring, the identification unit 212 identifies that starting point of the detected indication information in the audio data is the time signified by the time code.

The identification unit 212 is able to identify the time at any point in the audio data because the time at a point in the audio data can be identified. For example, the time code signifying the time $t_0$ is detected at a point 30 seconds after the start of the sound indicated by the audio data, the time at which the generation of the audio data started is understood to be 30 seconds before the $t_0$. As described above, the identification unit 212 is able to relate the audio data and the time. The time in the present example embodiment is the time of the clock 110 of the information emission device 11. When the clock 110 is synchronized with the standard time of a country, the time identified by the identification unit 212 is the standard time of the country.

The detection unit 214 detects an audio event included in the audio data. The audio event is the sound that has a prescribed characteristic. For example, the audio event is the sound signifying the event (incident) preliminarily specified to the detection unit 214 that shows the event (incident) that the user wants to detect.

Note that Literature 1 and Literature 2 are the examples of literature related to detection and analysis of an audio event.
Literature 1: "Toward detection and discrimination of all sounds—present and future of audio event detection—", OHISHI Yasunori, The Acoustical Society of Japan Proceedings, Acoustical Society of Japan, 2014, pp. 1521-1524.
Literature 2: "Sound and Audio Analysis Technique and Application to Public Solution", KOSHINAKA Takafumi, et al., NEC(Nippon Electric Company) Technical Journal, NEC corporation, November 2014, vol. 67, No. 1, pp. 86-89.

An audio event is a sound that satisfies a condition preliminarily defined by a user, for example. For example, the detection unit 214 stores a feature of the indicated audio event, and the predetermined standard related to the similarity to the feature. Then, the detection unit 214 extracts, as the audio event, the sound having a feature in which the similarity to the feature of the indicated audio event conforms to the predetermined standard.

The preliminarily defined condition may not be the condition related to a specific event. For example, the sound whose volume exceeds a prescribed value may be specified as the audio event that the user wants to detect.

A plurality of types of audio events may exist. For example, the sound of hitting a metal plate, the sound of hitting a glass plate, and a scream may be set as three types of audio events. Each of the audio events may be classified into one of a plurality of classes. For example, since the sound of hitting a metal plate resembles the sound of hitting a glass plate, these two types of sounds may be classified to a same class. When the audio event has been classified, information indicating relation between the audio event and the class may be stored by the detection unit 214 as the information signifying the classification of the audio event, for example.

The detection unit 214 detects the audio event and the time at which the audio event occurred. Alternatively, the identification unit 212 may identify the time at which the audio event detected by the detection unit 214 occurred, and may relate the identified time to the detected audio event.

The output unit 215 outputs information in which the detected audio event and the time at which the audio event occurred are related.

For example, the output unit 215 may display a list signifying the audio events and the time at which the audio events occurred on a screen. When a detection of one audio event is demanded, the output unit 215 may display only the time at which the audio event occurred on the screen.

<Operation>

Figure 2:
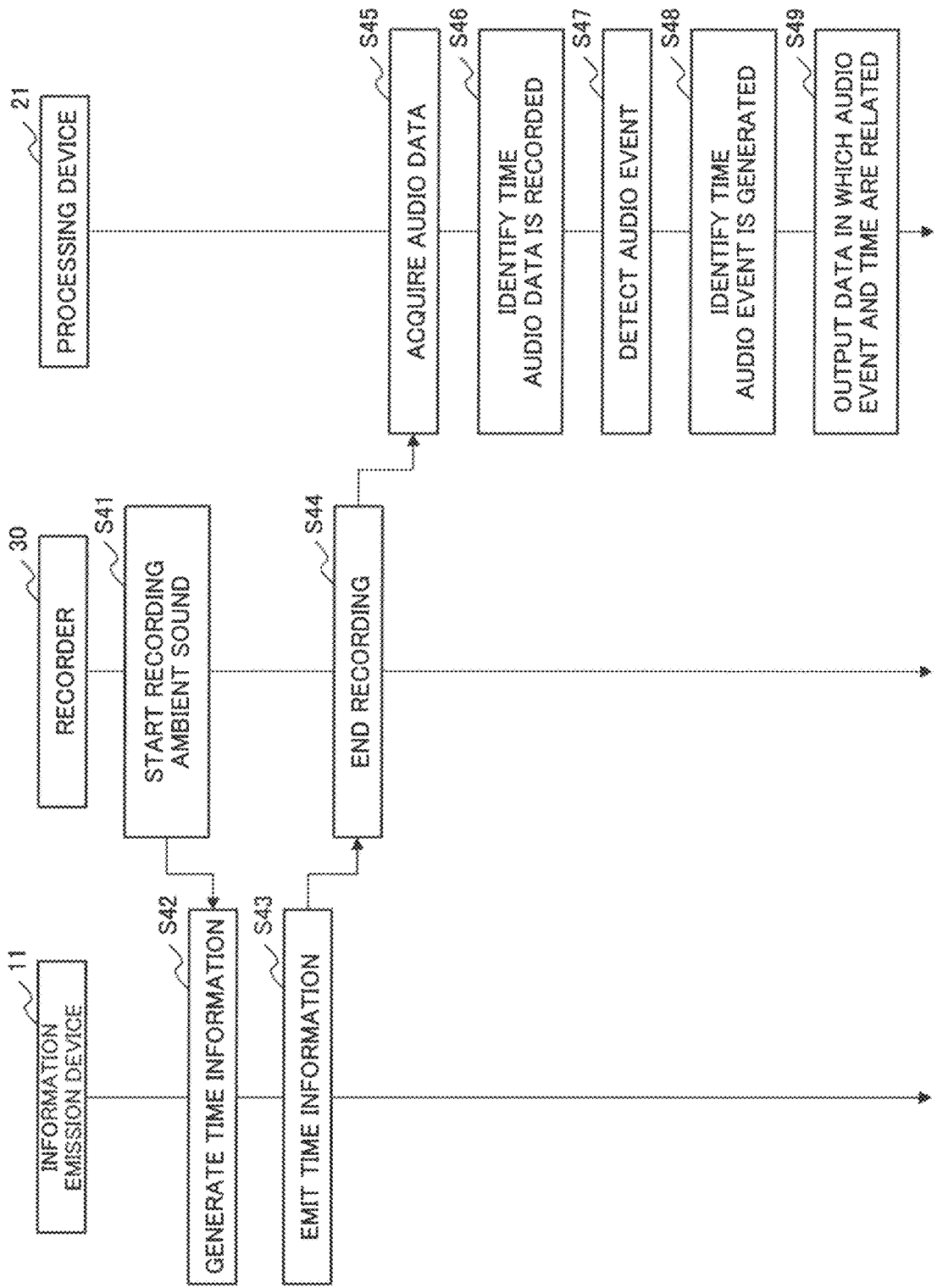
FIG. 2 is a flow chart illustrating a flow of an operation of the signal processing system according to the first example embodiment.

A flow of an operation of the signal processing system 1 according to the first example embodiment will be described with reference to the flow chart of FIG. 2.

Firstly, the recorder 30 starts recording the ambient sound (step S41). For example, a person may start the recorder.

Then, in the information emission device 11, when the time of the clock 110 becomes the time stored by the timing storage unit 112, the calling by the control unit 111 causes the time information generation unit 113 to generate time information (step S42).

As a timing for emitting time information, time that is estimated to have low possibility of occurrence of an audio event to be detected, or time at which the audio event to be detected is estimated not to occur may be set. For example, a user may estimate the time at which the audio event the user wants to detect is less likely to occur or does not occur, and may set the estimated time as the timing for emitting the time information. Alternatively, the information emission device 11 may estimate, on the basis of data of the past audio events and the like, the time at which the audio event is less likely to occur, and may set the estimated time as the timing for emitting the time information. With the above-described setting, detection of the time information by the identification unit 212 becomes easy, and detection of the audio event to be detected becomes less likely to be disturbed.

In addition, when there is a timing at which the user determines that an audio event is not necessary to be detected, the user may set the timing as the timing for emitting the time information.

When there is a frequency band that is irrelevant to the target audio event or the environmental sound (in other words, when other signals do not interfere or disturb the detection of time information in the frequency band), the time information generation unit 113 may set the time information in such a way that the frequency of the time information ranges within the frequency band. As a result of configuring as described above, the time information and the environmental sound (and consequently the audio event) are not confused, and the accuracy of the detection of the time information by the identification unit 212 and the detection of the audio event by the detection unit 214 can be increased.

When the time information is generated, the emission unit 115 emits the time information (step S43). As a result, the recorder 30 records not only the ambient sound, but also the time information emitted by the emission unit 115 (on the same channel).

When the time to finish the collection of the audio data has come, the recorder 30 stops recording (step S44). A person may stop the operation of the recorder 30, or the recorder 30 may have a structure to finish recording when a predetermined period of time passes after the recording started. In the present example embodiment, the described is performing the process of the following steps after finishing the recording, however, finishing of the recording may not necessarily be required for the process of the following steps in some example embodiments.

Then, in the processing device 21, the acquisition unit 211 acquires the audio data acquired by the recorder 30 (step S45). The identification unit 212 identifies the time at which the audio data are recorded on the basis of the time information included in the audio data (step S46).

Meanwhile, the detection unit 214 detects an audio event included in the audio data (step S47). The identification unit 212 relates the time to the detected audio event (step S48).

Finally, the output unit 215 outputs the information in which the audio event and the time are related (step S49).

<Effect>

With the signal processing system 1 according to the first example embodiment, the time at which the audio data are generated, and the time at which a certain signal in the audio data (especially, the audio event) is generated can be identified. The reason is that, the time information signifying the time emitted by the information emission device 11 is included in the audio data, and the processing device 21 detects the time information. In this system, since the information signifying the time is not an electric signal but a sound, the recorder 30 only needs to have a recording function. In other words, the recorder 30 does not need to include a special channel or a circuit, and may be an inexpensive recorder on the market.

As described above, according to the present example embodiment, on the basis of data generated by the recorder having only the recording function, the time at which the data are generated and the occurrence time of any signal in the data can be identified.

(Modification)

In the above description, the clock 110 is set to match the standard time or the like. However, the clock 110 may not be set to match the standard time or the like. The clock 110 may have internal time. In such a case, the detected audio event can be related to the internal time of the information emission device 11. For example, when time information signifying "seven o'clock" is included in the audio data, the identification unit 212 understands that the time information is emitted at seven o'clock in the internal time of the information emission device 11 (i.e., at the time at which the clock 110 recognizes as seven o'clock).

In such a case, the processing device 21 may be configured to be able to acquire information of time provided by the clock 110. For example, the processing device 21 may be communicatively connected to the clock 110, or may be configured to be able to detect the sound emitted from the emission unit 115 directly. By comparing time provided by the clock 110 and time based on another time system other than the time system of clock 110 (for example, the standard time of the country), the processing device 21 is able to identify the difference between the time system of clock 110 and the another time system. Consequently, the identification unit 212 is able to relate the detected audio event and the time based on the another time system.

(Modification)

The method in which the emission unit 115 causes the recorder 30 to record the time information may not necessarily be a method involving an emission of a sound. The emission unit 115 may generate an electromagnetic noise that can reach an internal microphone amplifier or a power source of the recorder 30. The emission unit 115 may physically strike or give vibration to the recorder.

In other words, the information emitted by the emission unit 115 may have any form of information that is reflected onto the audio data of the recorder 30.

Second Example Embodiment

The signal processing system 2 according to a second example embodiment will be described.

<Configuration>

Figure 3:
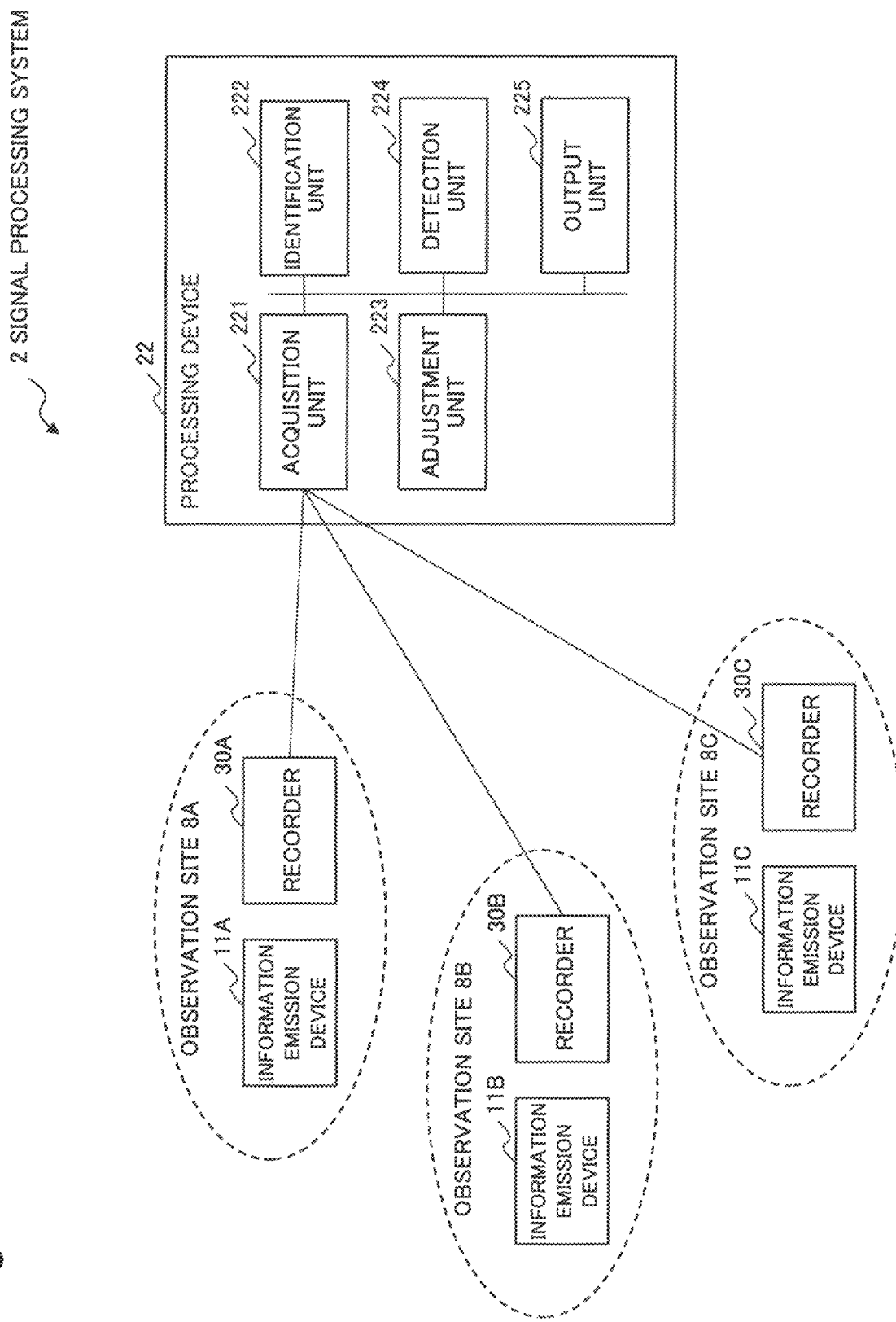
FIG. 3 is a block diagram illustrating a configuration of a signal processing system according to a second example embodiment of the present invention.

FIG. 3 is a block diagram illustrating a configuration of the signal processing system 2. The signal processing system 2 includes a plurality of information emission devices 11, a plurality of recorders 30, and a processing device 22.

Each of the recorders 30 may be same as the recorder 30 in the first example embodiment. The three recorders 30 in FIG. 3 are given reference signs 30A, 30B and 30C, respectively. However, the number of the recorders 30 is not limited to three. Hereinafter, when the recorders are to be distinguished, reference signs with alphabets such as 30A, 30B and 30C are given. When the recorders are generally referred or not identified, reference number "30" is given.

In the present example embodiment, each of the plurality of recorders 30 are arranged at different places. The area the recorder 30A is arranged is an observation site 8A, the area the recorder 30B is arranged is an observation site 8B, the area the recorder 30C is arranged is an observation site 8C.

Each of the recorders 30 collects the ambient sound for a predetermined period of time (for one day for example), like the first example embodiment. Each of the recorders 30 stores the collected sounds in an internal storage medium as audio data of the time series, for example.

The information emission devices 11 are arranged in such a way that each recorder 30 detects the sound emitted by at least one of the information emission devices 11. In the example of FIG. 3, information emission devices 11 are arranged near the recorders 30 (a position the emitted time information may be recorded) respectively. Hereinafter, for illustrative purpose, each of the information emission devices 11 may be given a reference sign attached with the same alphabet (A, B, C) as the one attached to the reference sign of the recorder 30 that is arranged at the same observation site as the information emission device 11. In addition, for illustrative purpose, hereinafter, the internal configuration of each of the information emission devices 11 may be expressed with a reference signs attached with the same alphabet as the one attached to the information emission device 11 that includes the configuration.

In an embodiment where the time information emitted by the same information emission device 11 can be recorded by some recorders 30, the number of the information emission devices 11 may not be the same as the number of the recorders 30.

The configuration of the information emission device 11 may be similar to the configuration described in the first example embodiment. In the present example embodiment, the clocks 110 of the information emission devices 11 are calibrated to one time system (for example, the standard time of the country).

Information of the timing stored in the timing storage unit 112 of each of the information emission devices 11 may be the same, or may be different. The timing storage units 112 may store, depending on the observation site, the time at which the collection of the sound to be collected at the observation site is less likely to be disturbed. As a result, the possibility that the detection of the audio event at each observation site is disturbed by time information can be decreased.

The time codes of time information generated by time information generation units 113A to 113C may be different, or may be the same. For example, the time code defined in the time information generation unit 113A may be a signal that is translated into audio by an audio modem, and the time code defined in the time information generation unit 113B may be Morse code, and the time code defined in the time information generation unit 113C may be a signal expressing the time by the number of times the audio appears.

In addition, the frequency range of the sound of the time information may differ at each information emission device 11.

The time information may be configured in such a way that at least the identification unit 222 described later can correctly detect and identify the source of emission.

The processing device 22 includes an acquisition unit 221, an identification unit 222, an adjustment unit 223, a detection unit 224 and an output unit 225. The acquisition unit 221, identification unit 222, detection unit 224 and the output unit 225 may include similar function as the acquisition unit 211, identification unit 212, detection unit 214 and the output unit 215 of the first example embodiment, respectively.

The acquisition unit 221 acquires audio data from each of the recorders 30.

The identification unit 222 detects the time information from each audio data. The identification unit 222 decodes the time code and identifies the time acquired by decoding as the time at which the time information is emitted. As a result, the identification unit 222 is able to relate, to each of the audio data, the time provided by the clock 110 of the information emission device 11 arranged at the observation site at which the audio data are collected.

The adjustment unit 223 relates a single time axis to each audio data. In other words, the adjustment unit 223 adjusts the time axis of each audio data into a unified time axis.

Figure 4:
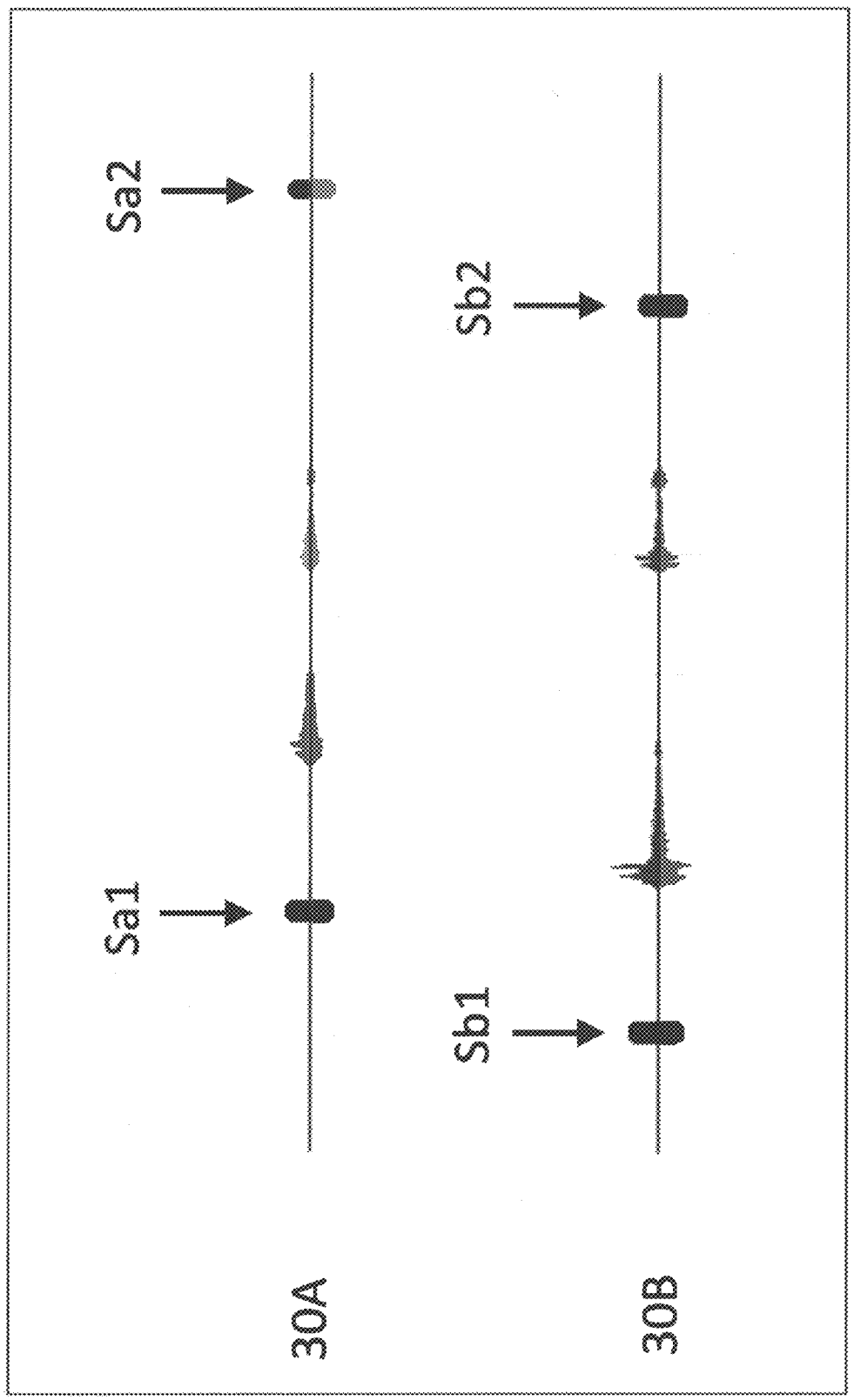
FIG. 4 is a diagram illustrating an example of audio data generated by each of the two recorders.

For instance, adjustment method of adjusting the time axes of the audio data respectively acquired by recorder 30A and recorder 30B will be described. For example, the audio data respectively acquired by the recorder 30A and recorder 30B are the time series data illustrated in FIG. 4 (in FIG. 4, the each of audio data is illustrated in a waveform, with the time as the horizontal axis and the amplitude as the vertical axis). In FIG. 4, the signals Sa1 and Sa2 are the time information signals that are identified in the audio data provided by the recorder 30A. The signals Sb1 and Sb2 are the time information signals that are identified in the audio data provided by the recorder 30B.

For the audio data, the adjustment unit 223 firstly relates the time axis T to the audio data generated by the recorder 30A. Specifically, the adjustment unit 223 matches the time axis of the audio data and the time axis T in such a way that the time signified by the signal Sa1 on the time axis T corresponds to the time at which the signal Sa1 is detected (assumed to be Ta1), for example.

Figure 5:
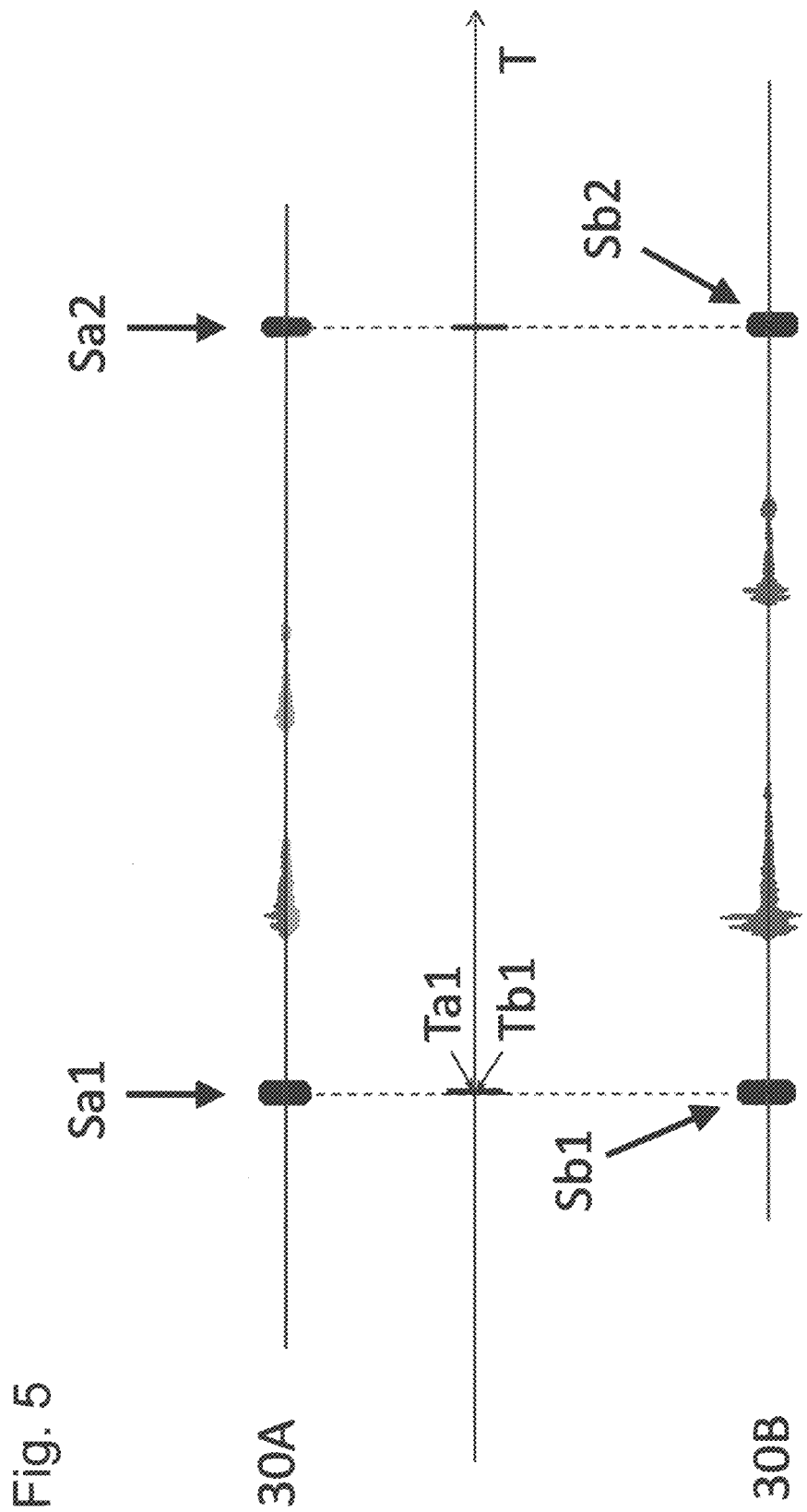
FIG. 5 is a diagram illustrating a concept of adjusting time axes.

FIG. 5 is a diagram illustrating a concept of adjusting the time axes. In FIG. 5, a diagram in which the point Ta1 on the time axis T and the time at which the signal Sa1 is detected are aligned in the vertical direction of the paper is illustrated. Then, the adjustment unit 223 similarly relates the time signified by the signal Sb1 on the reference time axis T (assumed to be Tb1) to the point at which the signal Sb1 is detected. When the Ta1 and Tb1 are equal, the signal Sa1 and the signal Sb1 are at the same position on the time axis T, as illustrated in FIG. 5. The adjustment unit 223 may adjust the time axis of the audio data on the basis of the signal Sa2 or signal Sb2.

When time units (in other words, length per frame) of the two audio data are different, the adjustment unit 223 may expand/contract the time axis of one audio data on the basis of the signals Sa1, Sa2, Sb1 and Sb2. The adjustment unit 223 may adjust the time axis on the basis of the recording speed defined in the recorders 30. The recording speed is expressed as sample per second or the like when the recording method of the recorders 30 is digital, or as millimeter per second or the like when the recording method of the recorders 30 is analog recording by an analog tape recorder.

Similarly, the adjustment unit 223 relates the time axis of the audio data by the recorder 30C to the reference time axis.

With the above processing, the time axes of the plurality of audio data are unified. In other words, the processing device 22 is able to deal with each audio data in a unified time axis.

The detection unit 224 detects an specified audio event. The detection unit 224 detects the audio event that is detected at the same time on the plurality of audio data. The detection unit 224 may detects an audio event from the entirety of the audio data or a part of the audio data. For example, a user may specify the range of the time in which the detection unit 224 detects an audio event.

Specifically, in the plurality of audio data, the detection unit 224 extracts audio events whose types are the same and whose time is the same on the unified time axis as the audio events that originate from the same event.

As an example, the specified audio events are assumed to be three types that are a scream, a glass breaking sound and a sound of hitting a clay wall.

For example, when a scream is detected at a certain time in the audio data by the recorder 30A, and a scream is also detected at the same time in the audio data by the recorder 30B, the two audio events are the audio events that originate from the same scream.

For example, when a scream is detected at a certain time in the audio data by the recorder 30A, and the audio event detected at the same time in the audio data by the recorder 30B is the glass breaking sound, the two audio events are not the same.

Note that "same time" does not mean an exact match. However, it means that the times are close enough to each other so that times can be regarded as the same. When defining the degree of proximity that is regarded as "same", the accuracy of the internal time, the difference of processing speed of each information emission device 11, and the difference of time the sounds reach the recorders 30 may be taken into consideration. For example, the detection unit 224 may regard a plurality of audio events whose time difference is less than one second as the audio events that originate from the same event.

The detection unit 224 passes the type and time of the audio events that are regarded as originating from the same event to the output unit 225.

The output unit 225 outputs information related to the audio events that are regarded as originating from the same event. For example, the output unit 225 may display, with respect to the audio events that are regarded as originating from the same event, the type, observation sites where the event is recorded, and the time when the event is recorded on a screen. The output unit 225 may inform using a sound or the like that an audio event is widely detected. The output unit 225 may display the observation sites at which the recorders 30 that recorded the audio event are arranged on a map. The output unit 225 may control a surveillance camera that is arranged in such a way as to be able to observe an observation site where the recorders 30 that recorded the audio event were arranged to capture the area including the observation site.

<Operation>

Figure 6:
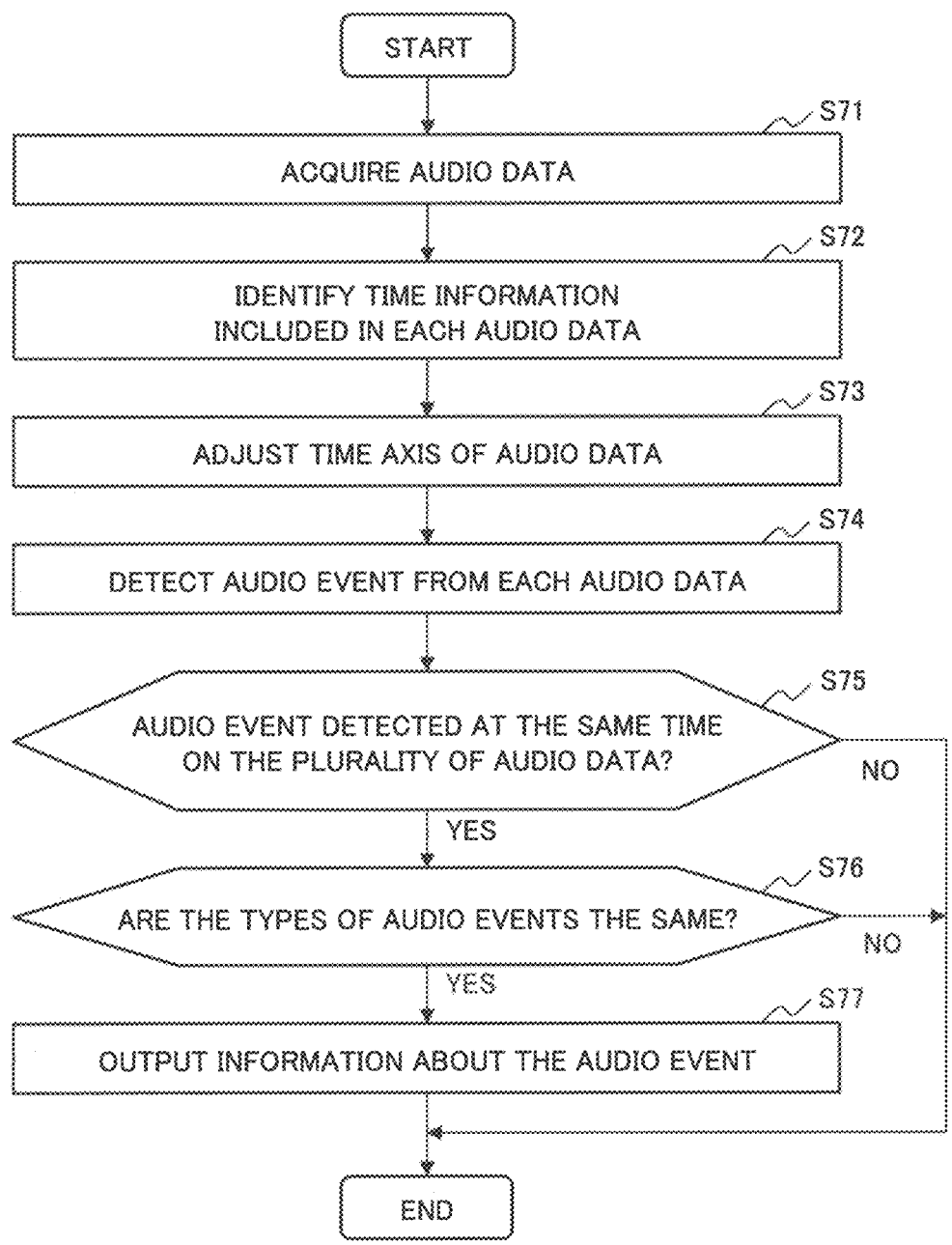
FIG. 6 is a flow chart illustrating a flow of an operation of each unit of the signal processing system according to the second example embodiment.

A flow of an operation of the processing device 22 according to the second example embodiment will be described with reference to the flow chart of FIG. 6.

Firstly, the acquisition unit 221 acquires the audio data acquired by the recorders 30A to 30C (step S71). Next, the identification unit 222 identifies the time information included in each audio data (step S72).

Then, the adjustment unit 223 adjusts the time axis of each audio data on the basis of the identified time information (step S73).

Meanwhile, the detection unit 224 detects an audio event from each audio data (step S74). Then, the detection unit 224 determines whether there are audio events that are detected at the same time on a plurality of audio data (step S75). When applicable audio events exist (YES in step S75), determination of whether the types of the audio events that occurred at the same time are the same is performed (step S76). When the types of the audio events are the same (YES in step S76), the information related to the audio events is output (step S77). When the result of the determination at step S75 or step S76 is NO, the operation of the processing device 22 terminates.

The process of the step S74 may be performed before the process of step S72 and the process of step S73. Moreover, the detection unit 224 may determine, after extracting audio events having the same type, whether the time at which the audio events occurred is the same.

<Effect>

With the signal processing system according to the second example embodiment, the same event that is recorded on two or more recorders 30 can be detected. The reason is that the adjustment unit 223 relates the single time axis to the audio data on the basis of the time information included in each audio data, and the detection unit 224 detects audio events of the same type that are recorded by a plurality of recorders 30 at the same time on the time axis.

In other words, the processing device 22 can synchronize a plurality of audio data using the identification unit 222 and the adjustment unit 223.

(Modification)

The clock 110 does not need to be calibrated to a single time system so long as the processing device 22 is configured to be able to acquire the time provided by the clocks 110 of the information emission devices 11. The information emission devices 11 only need to have internal time.

Figure 7:
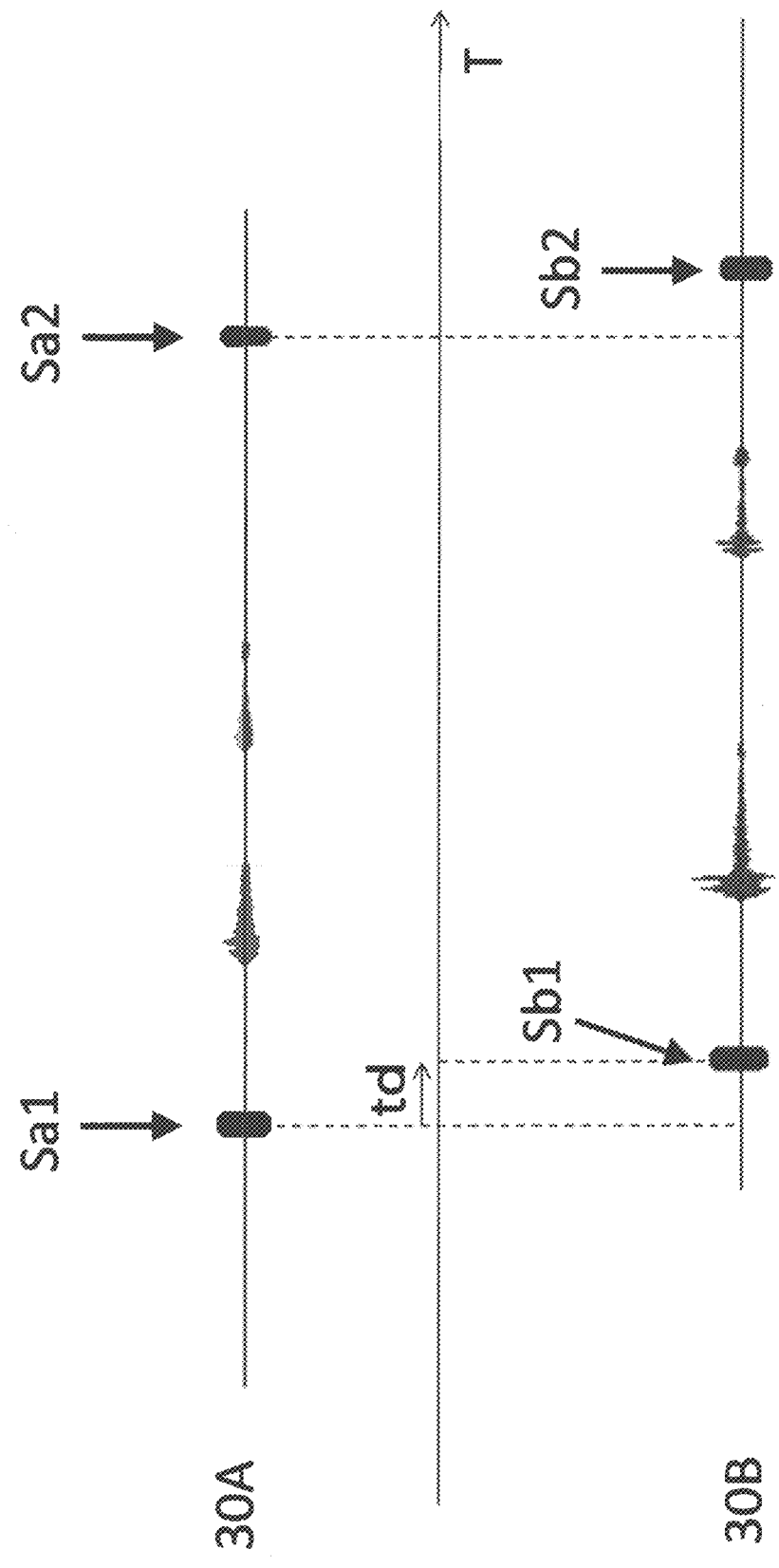
FIG. 7 is a diagram illustrating a concept of adjusting time axes on the basis of a discrepancy between two clocks.

For example, even when the clocks 110A and 110B are not calibrated to a single time system, if how much the time provided by the clock 110A is different from the time provided by the clock 110B is known, the adjustment unit 223 can unify the time axes of the two audio data. The adjustment unit 223 may adopt the time axis of the clock 110A as the single time axis T, for example. When the delay of the clock 110B from the clock 110A is td, the adjustment unit 223 may, as illustrated in FIG. 7, shift the time axis of the audio data of the recorder 30B by td from the time axis in the case of assuming that the clock 110B is matching the clock 110A. The value of td can be calculated by the adjustment unit 223 acquiring the time provided by the clock 110A and the time provided by the clock 110B respectively at any timings, for example.

When the accuracy of time function of each clock 110 is low or unknown, the adjustment unit 223 may acquire the time provided by each clock 110 a plurality of times. The adjustment unit 223 may correct the time signified by the time information to a plausible time through analyzing, on the basis of the time acquired the plurality of times, characteristics and tendency of the shifting of the time provided by the clocks 110 from the standard time system. As a result, the adjustment unit 223 can adjust the time axis of each audio data with higher accuracy.

In the above-described modification, the similar effect as the second example embodiment can be obtained.

Third Example Embodiment

A signal processing system 3 according to a third example embodiment of the present invention will be described. The signal processing system 3 is a modification of the signal processing system 2 according to the second example embodiment. The component of the third example embodiment to which a name and a reference sign that are the same as those of the second example embodiment is given has a similar function unless otherwise noted.

In the present example embodiment, it is assumed that pieces of time information that are emitted from different information emission devices 11 are recorded on at least one recorder 30. In this case, the clocks 110 of the different information emission devices 11 may not be calibrated to a single time system.

Figure 8:
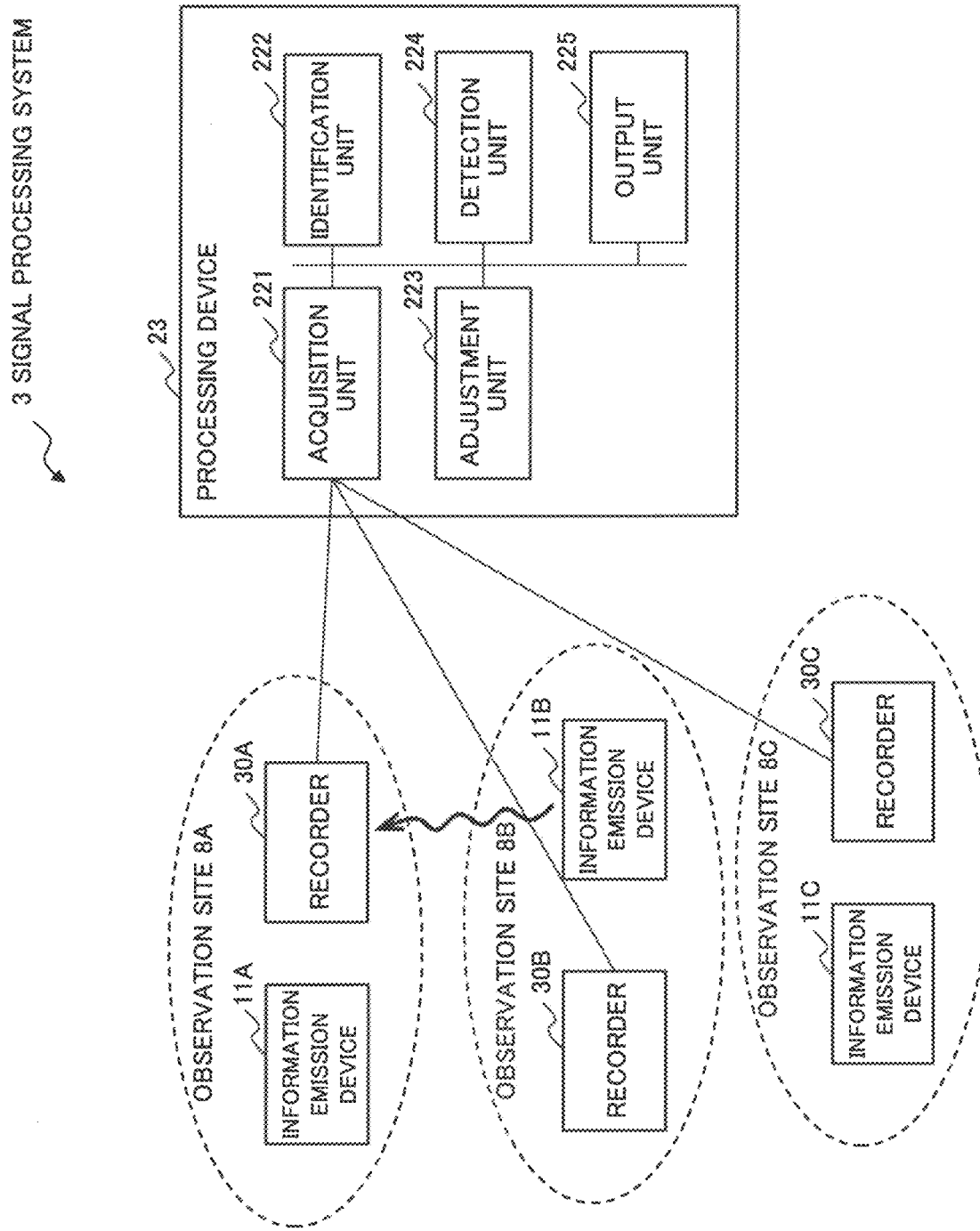
FIG. 8 is a block diagram illustrating a configuration of a signal processing system according to a third example embodiment of the present invention.

FIG. 8 is a block diagram illustrating a configuration of the signal processing system 3 according to the third example embodiment of the present invention. As illustrated in FIG. 8, it is assumed that the time information emitted by the information emission device 11B is also recorded by the recorder 30A.

Figure 9:
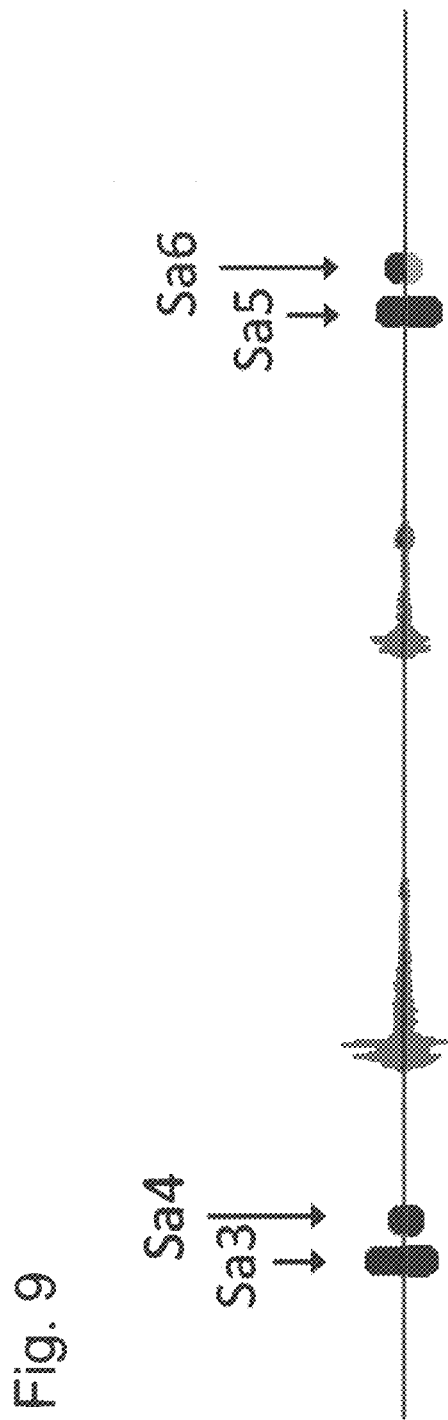
FIG. 9 is a diagram illustrating an example of audio data generated by a recorder according to the third example embodiment.

In this case, audio data generated by the recorder 30A will be as illustrated in FIG. 9. In other words, the identification unit 222 detects time information signals Sa3 and Sa5 emitted by the information emission device 11A and time information signals Sa4 and Sa6 emitted by the information emission device 11B from the audio data of the recorder 30A.

When two pieces of time information are configured in such a way that the two pieces of time information can be distinguished from one another (for example, the frequency range is different, or the signified time is different or the like), the identification unit 222 can identify, on each audio data, which of the information emission devices 11 emitted each of time information. The identification unit 222 may identify the source of emission of the time information on the basis of the position and the direction of the recorder 30A and the volume of the detected time information.

Then, the identification unit 222 identifies the difference among each clock 110 of each information emission device 11, on the basis of the identified signal.

For example, it is assumed that the signal Sa3 is the signal of a sound emitted from the information emission device 11A at seven o'clock (based on the clock 110A), and the signal Sa4 is the signal of a sound emitted from the information emission device 11B at seven o'clock (based on the clock 110B). In such a case, the delay of the signal Sa4 relative to the signal Sa3 is the delay of the clock 110B relative to the clock 110A, in other words, the difference between the clock 110A and the clock 110B.

Note that, in the above description and the below description, it is assumed that the difference of the arrival time of the sounds due to the difference of distance between the recorder 30A and each information emission device 11 is negligibly small. In practice, when the difference of the arrival time is not negligible, the difference may be appropriately compensated by the identification unit 222 or the like.

The timing at which the signal is emitted may be different depending on each information emission device 11. In the above example, the signal Sa3 is the signal of a sound emitted from the information emission device 11A at seven o'clock (based on the clock 110A), and the signal Sa4 is the signal of a sound emitted from the information emission device 11B at eight o'clock (based on the clock 110B). In the above configuration, when the difference of the emission time between the signal Sa4 and the Sa3 is 61 minutes, the clock 110B is understood to be one minute behind relative to the clock 110A.

The adjustment unit 223 may unify the time axis of the audio data generated by the recorder 30A and the time axis of the audio data generated by the recorder 30C on the basis of the identified difference. For example, when the clock 110B is one minute behind relative to the clock 110A, after relating the two audio data to the single time axis, the time axis of the audio data generated by the recorder 30B may be moved forward by one minute relative to the single time axis.

With the signal processing system according to the third example embodiment, the audio data of the recorders 30A to 30C may be synchronized even when the time of the clocks 110A to 110C is not calibrated to the single time system and the time provided by each clock 110A to 110C is diverse. Therefore, the detection unit 224 can detect the same audio event that is recorded on two or more recorders, like the second example embodiment.

(Another Example of Identifying Source of Emission)

The information emission device 11 that is the source of emission of the time information can be identified by configuring the recorder 30A to record the time information from at least one information emission device 11 at least twice. For example, it is assumed that three signals that do not directly show the time are detected in the audio data. The detected times of the three signals are t1, t2, t3 in the order of detection, the signal recorded the earliest on the time series having the highest priority. It is assumed that times A1 and A2 are stored in timing storage unit 112A, and a time B1 is stored in timing storage unit 112B. The identification unit 222 identifies the source of emission of each signal by comparing t1 to t3 with A1, A2 and B1. For example, when the difference between A1 and A2 is equal to the difference between t1 and t3, the signals of the sounds emitted at times t1 and t3 can be identified as the signals of the sounds emitted by the information emission device 11A. Moreover, the signal of the sound emitted at t2 that is unidentified can be identified as the signal of the sound emitted by the information emission device 11B. With the information of A1, A2 and B1, the identification unit 222 can identify the difference between the clocks 110 of the two information emission devices 11. Note that, when the difference between A1 and A2 is equal to the difference between t1 and t2, and equal to the difference between t2 and t3, the source of emission would not be identified. In order to avoid the above issue, larger number of pieces of time information may be emitted by the information emission device(s) 11.

Fourth Example Embodiment

A signal processing system 4 according to a fourth example embodiment of the present invention will be described. The signal processing system 4 is a modification of the signal processing system 2 according to the second example embodiment. The component of the fourth example embodiment to which a name and a reference sign that are the same as those of the second example embodiment is given has a similar function unless otherwise noted.

Figure 10:
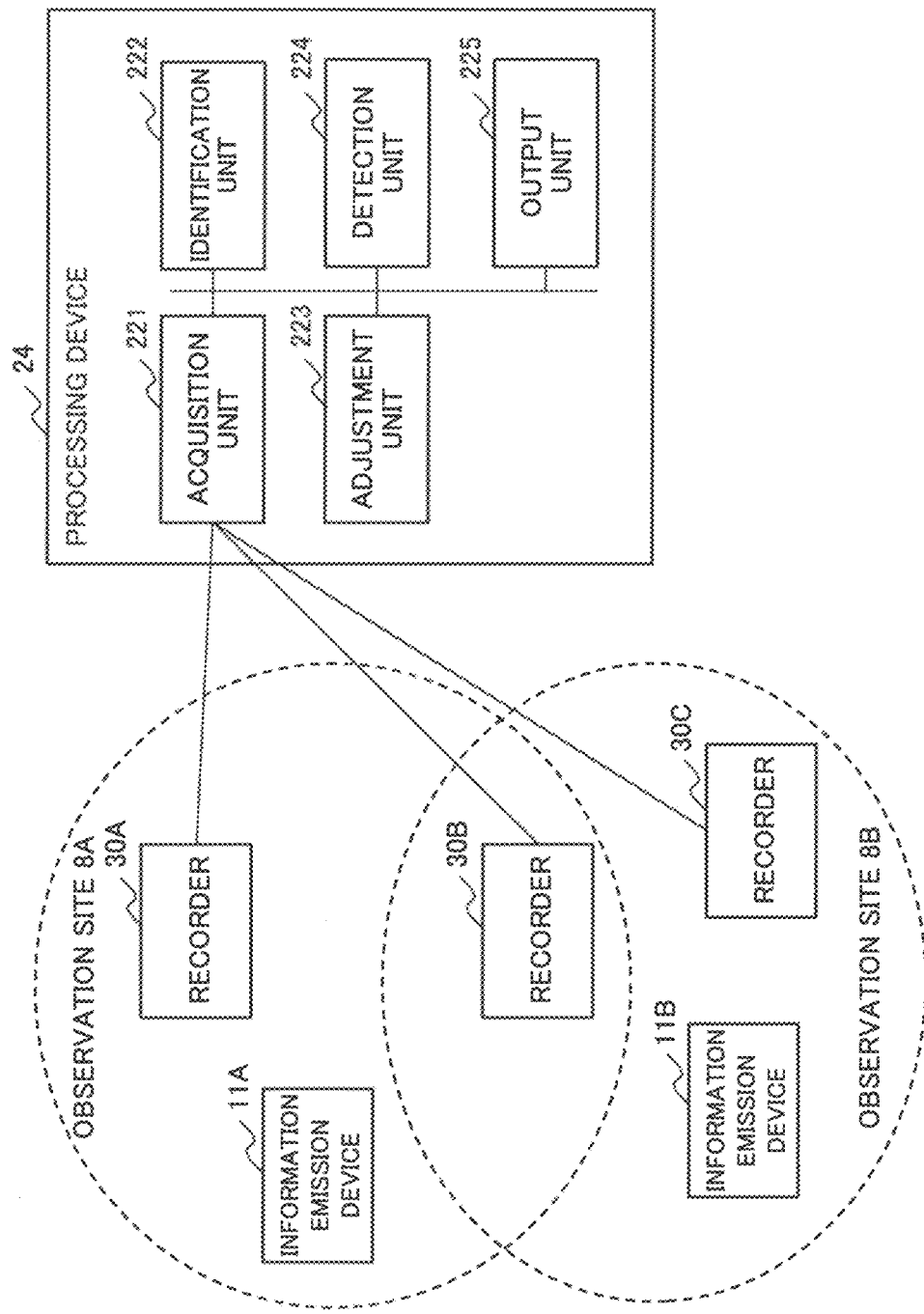
FIG. 10 is a block diagram illustrating a configuration of a signal processing system according to a fourth example embodiment of the present invention.

FIG. 10 is a block diagram illustrating a configuration of the signal processing system 4 according to the fourth example embodiment of the present invention. In the present example embodiment, it is assumed that the time information emitted by the information emission device 11A is recorded by the recorder 30A and recorder 30B, and the time information emitted by the information emission device 11B is recorded by the recorder 30B and recorder 30C. In FIG. 10, the areas each of which the sound emitted by the information emission device 11 is detected by the recorder 30 in are illustrated by broken lines.

In such a case, the identification unit 222 is able to relate the time provided by the clock 110A of the information emission device 11A to the audio data of the recorder 30A and the recorder 30B. In addition, the identification unit 222 is able to relate the time provided by the clock 110B of the information emission device 11B to the audio data of the recorder 30B and the audio data by the recorder 30C.

Since the audio data of the recorder 30B includes not only the time information emitted by the information emission device 11A but also the time information emitted by the information emission device 11B, the identification unit 222 is able to identify the time difference between the clock 110A and the clock 110B.

With the above configuration, the adjustment unit 223 is able to relate the audio data of the recorder 30C to which the time on the basis of the clock 110B is related to the time on the basis of the clock 110A of the information emission device 11A.

Therefore, with the configuration, even when each of the information emission devices 11 is not calibrated to standard time, and the time information by a plurality of information emission devices 11 is not recorded on the recorders 30A and 30C, the adjustment unit 223 is able to relate the same time axis to each audio data of the recorders 30A and the 30C.

Fifth Example Embodiment

As a fifth example embodiment of the present invention, a processing device 20 including a major configuration of the present invention is described.

Figure 11:
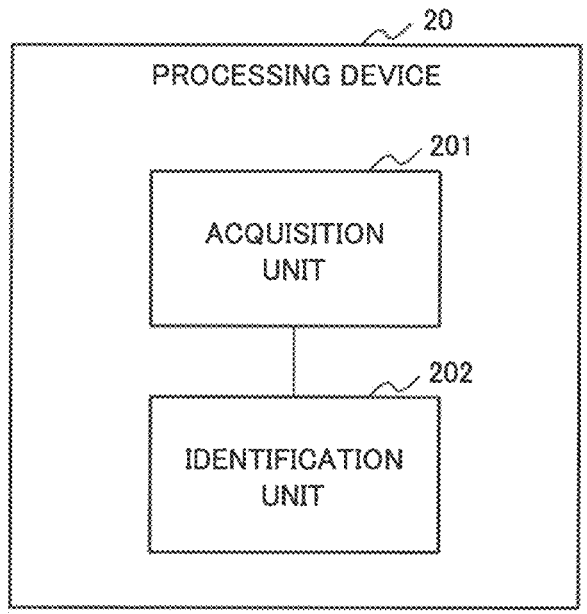
FIG. 11 is a block diagram illustrating a configuration of a processing device 20 according to a fifth example embodiment of the present invention.

FIG. 11 is a block diagram illustrating a configuration of the processing device 20 according to the fifth example embodiment. The processing device 20 includes an acquisition unit 201 and an identification unit 202.

Figure 12:
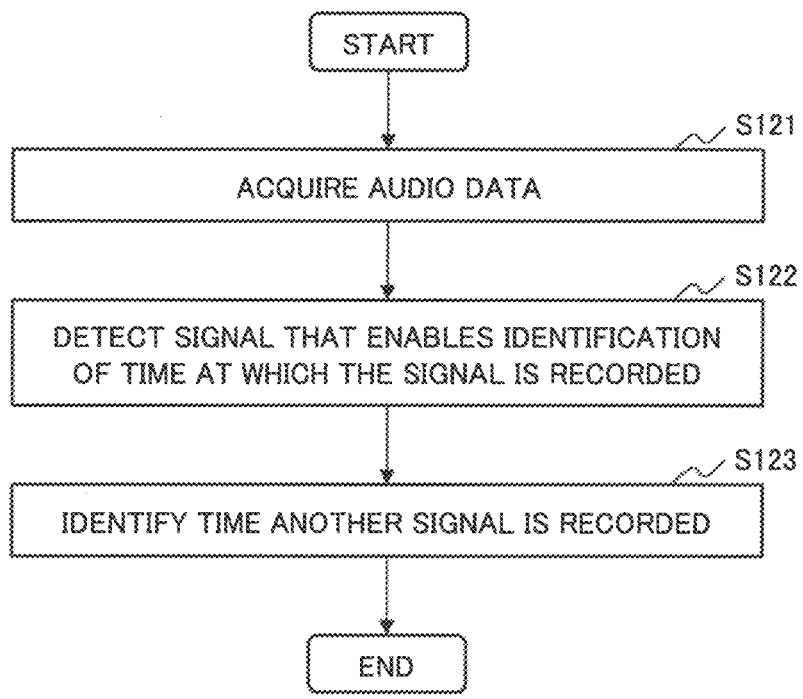
FIG. 12 is a flow chart illustrating a flow of an operation of the processing device 20 according to the fifth example embodiment.

An operation of the processing device 20 will be described with reference to the flow chart of FIG. 12.

Firstly, the acquisition unit 201 acquires the audio data in which audio is recorded (step S121).

Then, the identification unit 202 detects a signal that is included in the audio data and that enables identification of time at which the signal is recorded (step S122). The time mentioned above is the time in some time system. For example, the time mentioned above is the internal time of the device that emitted the signal. When the internal time of the device is calibrated to standard time, the time at which the signal is generated can be related to the standard time. When the difference between the internal time of the device and the internal time of another device is known, the time at which the signal is generated can also be related to the internal time of the other device.

Then, the identification unit 202 identifies, on the basis of the detected signal, the time at which another signal included in the audio data is recorded (step S123).

Figure 13:
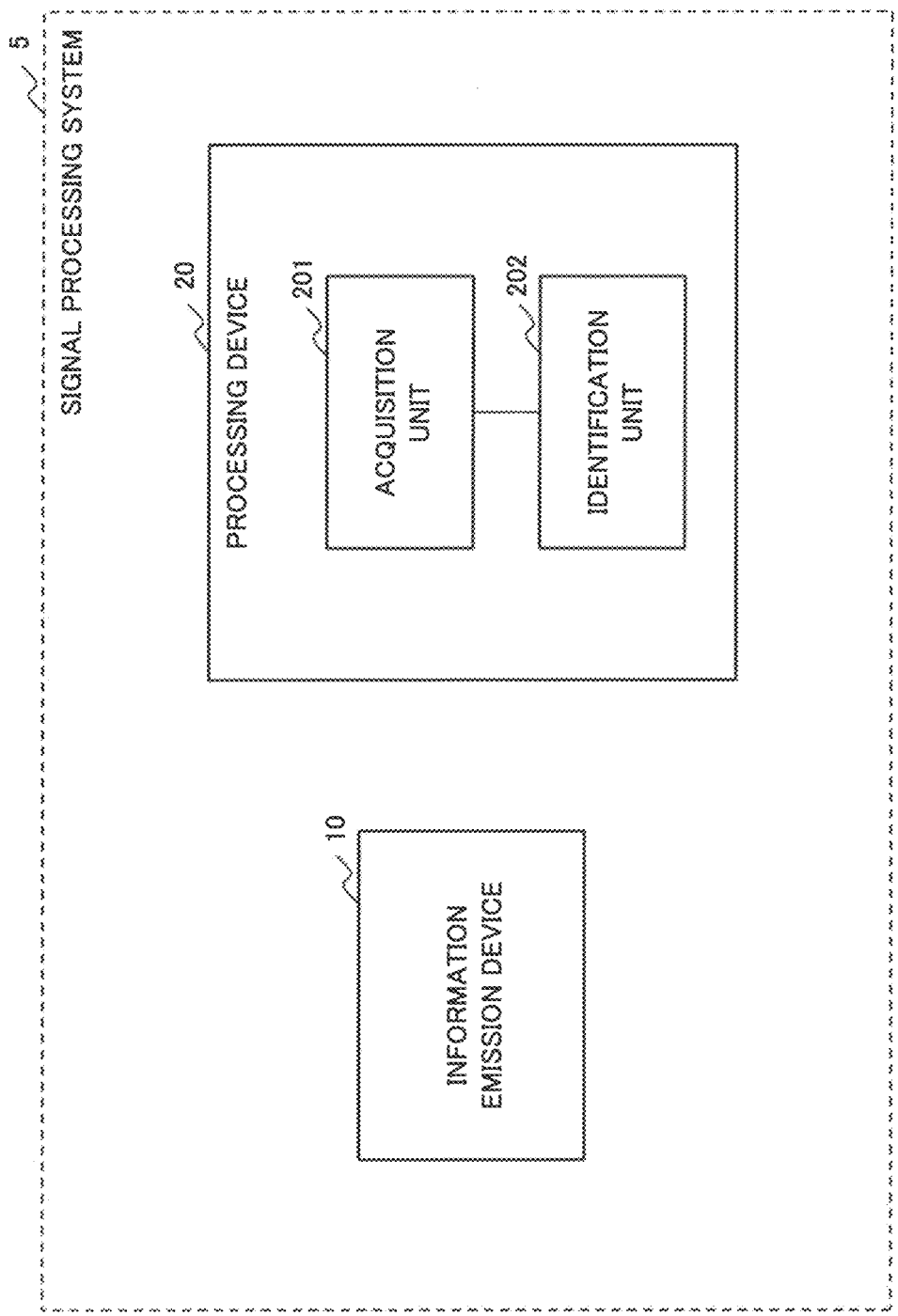
FIG. 13 is a block diagram illustrating a configuration of a signal processing system according to the fifth example embodiment.

FIG. 13 is a block diagram illustrating a configuration of a signal processing system 5 including the processing device 20. The signal processing system 5 includes the information emission device 10 in addition to the processing device 20.

The information emission device 10 emits a signal which enables identification of the time at which the signal is generated under a standard time, in such a way that the signal is recorded by a recorder (not illustrated in the diagram) that continually records, for example, an environmental sound. With such a configuration, the recorder generates audio data including the signal that the information emission device emitted.

On the basis of the audio data generated by the recorder 30, the processing device 20 can acquire information about the time at which the audio data is generated. The reason is that, the signal included in the audio data shows the time at which the signal is emitted.

(About Hardware)

Figure 14:
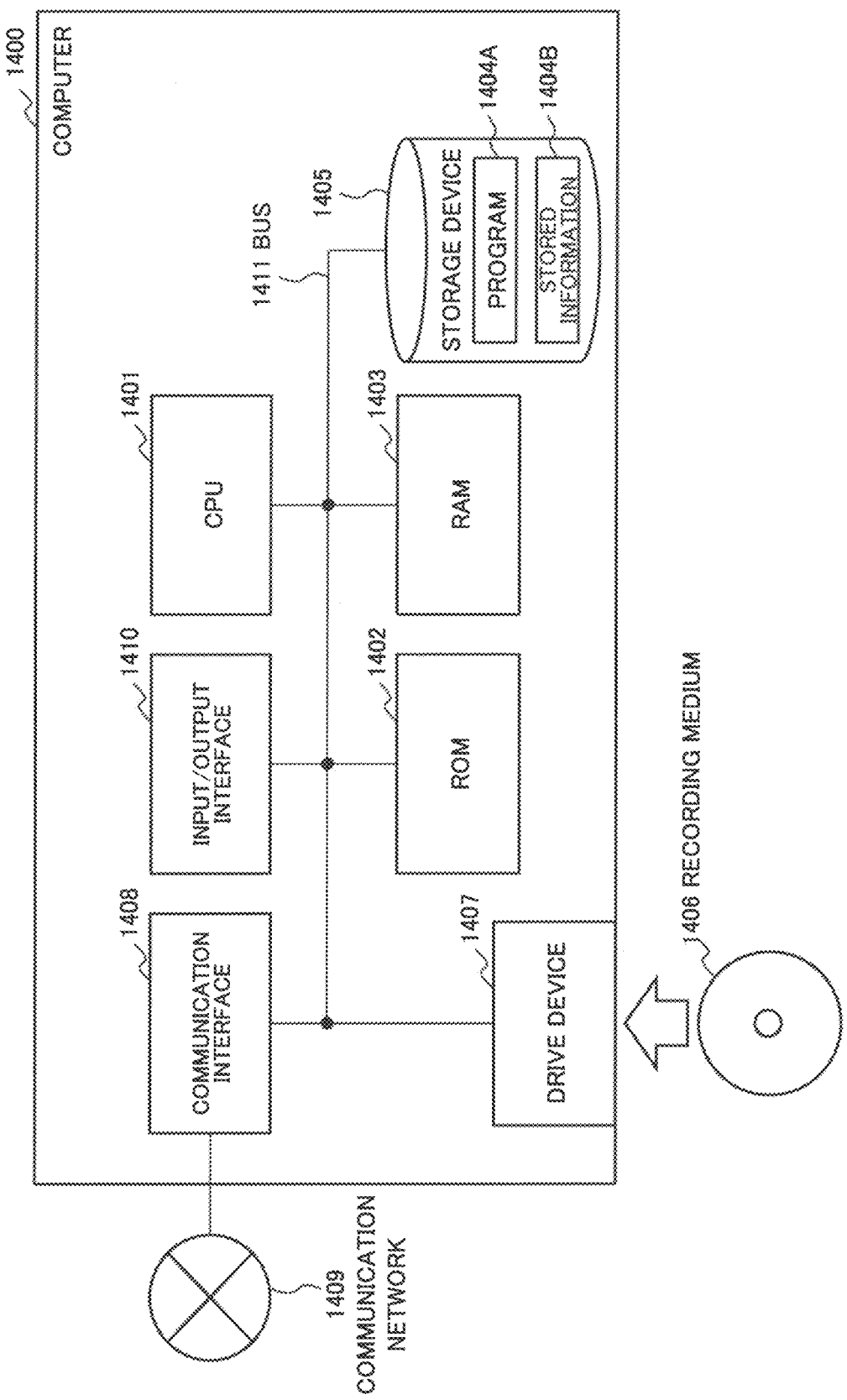
FIG. 14 is a block diagram illustrating an example of a hardware achieving each unit of each example embodiment of the present invention.

In the example embodiments of the present invention described above, each of components of the devices indicates a block on a function basis. A part or the entirety of the components of devices is achieved by a possible combination of, for example, a computer 1400 as illustrated in FIG. 14 and a program. The computer 1400 includes, as one example, configurations as follows.

a CPU (Central Processing Unit) 1401
a ROM (Read Only Memory) 1402
a RAM (Random Access Memory) 1403
a program 1404A and stored information 1404B to be loaded on RAM 1403
a storage device 1405 to store the program 1404A and stored information 1404B
a drive device 1407 that reads from/writes on a recording medium 1406
a communication interface 1408 connected with the communication network 1409
an input/output interface 1410 that inputs/outputs data
a bus 1411 that connects the components Each of the components of the devices in the example embodiments are achieved when the CPU 1401 runs the program 1404A achieving functions thereof after loading the program 1404A onto the RAM 1403. The program 1404A that achieves the function of the components of the devices is, for example, preliminarily stored on the storage device 1405 or ROM 1402, and the CPU 1401 reads the program when necessary. The program 1404A may be supplied to the CPU 1401 via the communication network 1409, or may be preliminarily stored on the storage medium 1406, and the drive device 1407 may read the program and provide the program to the CPU 1401.

The method for achieving each device has various modifications. Each of the components of the devices may be achieved by a possible combination of a separate computer 1400 and a program, for example. In addition, a plurality of components included in the devices may be achieved by a possible combination of one computer 1400 and a program.

A part or the entirety of the components of the devices is achieved by another general or dedicated circuit, a computer, or a combination thereof. These may be formed by a single chip, or may be formed by a plurality of chips that are connected via a bus.

When a part or the entirety of the components of the devices is achieved by a plurality of computers, circuits or the like, the plurality of computers, circuits or the like may be arranged in a concentrated manner or may be arranged in a distributed manner. For example, the computers, circuits or the like may be achieved in such a way that each of them is connected by a communication network, such as a client and server system, a cloud computing system or the like.

The present invention is not limited to the above-described example embodiments. Within the scope of the present invention, the present invention may be applied with various changes that may be understood by a person skilled in the art.

The present application claims the benefits of priority based on Japanese Patent Application No. 2016-123771, filed on Jun. 22, 2016, the entire disclosure of which is incorporated herein by reference.

All or part of the example embodiments described above may be described as in the following supplementary notes, but the present invention is not limited thereto.

(Supplementary Note 1)
A processing device comprising:
acquisition means for acquiring recorded audio data; and
identification means for: detecting a signal of a sound included in the audio data, the signal being emitted from an information emission device and enabling identification of time at which the signal is recorded; and identifying, based on the signal, time at which another signal included in the audio data is recorded.

(Supplementary Note 2)
The processing device according to Supplementary Note 1, further comprising:
detection means for detecting an audio event which is a predetermined type of sound as the another signal; and
output means for outputting information based on a result of identifying time at which the audio event is recorded by the identification means.

(Supplementary Note 3)
The processing device according to Supplementary Note 2, wherein
the acquisition means acquires first audio data including the signal and second audio data including the signal, and
the detection means detects the audio event that occurred at a same time in the first audio data and in the second audio data.

(Supplementary Note 4)
The processing device according to Supplementary Note 2 or 3, wherein the information emission device emits the signal at time that is set differently from predetermined time at which the audio event is likely to occur.

(Supplementary Note 5)
The processing device according to any one of Supplementary Notes 2 to 4, wherein a frequency of the signal is a frequency in a frequency band different from a predetermined frequency band of the audio event.

(Supplementary Note 6)
The processing device according to any one of Supplementary Notes 1 to 5, further comprising:
adjusting means for acquiring a difference between internal time of different information emission devices, and for relating, based on the difference, a single time axis to two or more audio data,
wherein the acquisition means acquires the two or more audio data including the signals from the different information emission devices.

(Supplementary Note 7)
The processing device according to Supplementary Note 6, wherein the adjusting means identifies a difference of internal time of two or more information emission devices based on audio data including signals from the two or more information emission devices, and relates, based on the difference, each of different audio data including the signal from one of the information emission devices to a single time axis.

(Supplementary Note 8)
A signal processing system comprising:
the processing device according to any one of Supplementary Notes 1 to 7; and
the information emission device that emits the signal in such a way that the signal is recorded by a recorder for recording the audio data.

(Supplementary Note 9)
A processing method comprising:
acquiring recorded audio data;
detecting a signal of a sound included in the audio data, the signal being emitted from an information emission device and enabling identification of time at which the signal is recorded; and
identifying, based on the signal, time at which another signal included in the audio data is recorded.

(Supplementary Note 10)
The processing method according to Supplementary Note 9, comprising:
detecting an audio event which is a predetermined type of sound as the another signal; and
outputting information based on a result of identifying time at which the audio event is recorded.

(Supplementary Note 11)

The processing method according to Supplementary Note 10, comprising:

acquiring first audio data including the signal and second audio data including the signal; and detecting the audio event that occurred at a same time in the first audio data and in the second audio data.

(Supplementary Note 12)

The processing method according to Supplementary Note 10 or 11, wherein the information emission device emits the signal at time that is set differently from predetermined time at which the audio event is likely to occur.

(Supplementary Note 13)

The processing method according to any one of Supplementary Notes 10 to 12, wherein a frequency of the signal is a frequency in a frequency band different from a predetermined frequency band of the audio event.

(Supplementary Note 14)

The processing method according to any one of Supplementary Notes 9 to 13, comprising:

acquiring two or more audio data including signals from different information emission devices;

acquiring a difference between internal time of the different information emission devices; and relating, based on the difference, a single time axis to the two or more audio data.

(Supplementary Note 15)

The processing method according to Supplementary Note 14, comprising identifying a difference of internal time of two or more information emission devices based on audio data including signals from the two or more information emission devices, and relates, based on the difference, each of different audio data including the signal from one of the information emission devices to a single time axis.

(Supplementary Note 16)

A computer-readable storage medium storing a program that causes a computer to perform:

acquisition processing for acquiring recorded audio data; and identification processing for: detecting a signal of a sound included in the audio data, the signal being emitted from an information emission device and enabling identification of time at which the signal is recorded; and identifying, based on the signal, time at which another signal included in the audio data is recorded.

(Supplementary Note 17)

The storage medium according to Supplementary Note 16, wherein the program further causes the computer to perform:

detection processing for detecting an audio event which is a predetermined type of sound as the another signal; and output processing for outputting information based on a result of identifying time at which the audio event is recorded by the identification processing.

(Supplementary Note 18)

The storage medium according to Supplementary Note 17, comprising:

the acquisition processing comprises acquiring first audio data including the signal and second audio data including the signal; and the detection processing comprises detecting the audio event that occurred at a same time in the first audio data and in the second audio data.

(Supplementary Note 19)

The storage medium according to Supplementary Note 17 or 18, wherein the information emission device emits the signal at time that is set differently from predetermined time at which the audio event is likely to occur.

(Supplementary Note 20)

The storage medium according to any one of Supplementary Notes 17 to 19, wherein a frequency of the signal is a frequency in a frequency band different from a predetermined frequency band of the audio event.

(Supplementary Note 21)

The storage medium according to any one of Supplementary Notes 16 to 20, wherein the acquisition processing comprises acquiring two or more audio data including signals from different information emission devices, and the program further causes the computer to perform adjustment processing for acquiring a difference between internal time of the different information emission devices and relating, based on the difference, a single time axis to the two or more audio data.

(Supplementary Note 22)

The storage medium according to Supplementary Note 21, wherein the adjustment processing comprises identifying a difference of internal time of two or more information emission devices based on audio data including signals from the two or more information emission devices, and relating, based on the difference, each of different audio data including the signal from one of the information emission devices to a single time axis.

REFERENCE SIGNS LIST

1~5 signal processing system
8A, 8B, 8C observation site
10,11 information emission device
20~24 processing device
30 recorder
110 clock
111 control unit
112 timing storage unit
113 time information generation unit
114 time code storage unit
115 emission unit
201,211,221 acquisition unit
202,212,222 identification unit
223 adjustment unit
214,224 detection unit
215,225 output unit
1400 computer
1401 CPU
1402 ROM
1403 RAM
1404A program
1404B stored information
1405 storage device
1406 recording medium
1407 drive device
1408 communication interface
1409 communication network
1410 input/output interface
1411 bus

What is claimed is:

1. A processing device comprising:
a memory; and
a processor coupled to the memory and configured to:
acquire recorded audio data by each of a plurality of recorders, the plurality of recorders being arranged at different places from each other;

detect a signal of a sound included in each of the audio data, the signal being emitted from a given information emission device and being a signal representing time indicated by the given information emission device; and identify, based on the signal, time at which another signal included in the audio data recorded by each record, wherein the processor is further configured to:

acquire two or more audio data that each include the signal as emitted by each of two or more information emission devices that each function as the given information emission device;

acquire a difference between times indicated by the two or more information emission devices that each emitted the signal recorded in the two or more audio data; and relate, based on the difference, a single time axis to the two or more audio data.

2. The processing device according to claim 1, wherein the processor is further configured to:

detect an audio event which is a predetermined type of sound as the another signal; and output information based on a result of identifying time at which the audio event is recorded.

3. The processing device according to claim 2, wherein the processor is configured to:

acquire first audio data including the signal and second audio data including the signal, and detect the audio event that occurred at a same time in the first audio data and in the second audio data.

4. The processing device according to claim 2, wherein the given information emission device emits the signal at time that is set differently from predetermined time at which the audio event is likely to occur.

5. The processing device according to claim 2, wherein a frequency of the signal is a frequency in a frequency band different from a predetermined frequency band of the audio event.

6. The processing device according to claim 1, wherein the processor is configured to:

acquire at least one audio data recording two or more signals emitted by different information emission devices among the plurality of information emission devices;

identify a difference of internal time of the different information emission devices based on the at least one audio data; and relate, based on the difference, the single time axis to the two or more audio data recording the signal from one of the different information emission devices.

7. A processing method comprising:

acquiring recorded audio data by each of a plurality of recorders, the plurality of recorders being arranged at different places from each other;

detecting a signal of a sound included in each of the audio data, the signal being emitted from a given information emission device and being a signal representing time indicated by the given information emission device;

identifying, based on the signal, time at which another signal included in the audio data recorded by each record;

acquiring two or more audio data that each include the signal as emitted by each of two or more information emission devices that each function as the given information emission device;

acquiring a difference between times indicated by the two or more information emission devices that each emitted the signal recorded in the two or more audio data; and relating, based on the difference, a single time axis to the two or more audio data.

8. The processing method according to claim 7, comprising:

detecting an audio event which is a predetermined type of sound as the another signal; and outputting information based on a result of identifying time at which the audio event is recorded.

9. The processing method according to claim 8, comprising:

acquiring first audio data including the signal and second audio data including the signal; and detecting the audio event that occurred at a same time in the first audio data and in the second audio data.

10. The processing method according to claim 8, wherein the given information emission device emits the signal at time that is set differently from predetermined time at which the audio event is likely to occur.

11. The processing method according to claim 8, wherein a frequency of the signal is a frequency in a frequency band different from a predetermined frequency band of the audio event.

12. A non-transitory computer-readable storage medium storing a program that causes a computer to perform processing comprising:

acquiring recorded audio data by each of a plurality of recorders, the plurality of recorders being arranged at different places from each other; and detecting a signal of a sound included in each of the audio data, the signal being emitted from a given information emission device and being a signal representing time indicated by the given information emission device;

identifying, based on the signal, time at which another signal included in the audio data recorded by each record;

acquiring two or more audio data that each include the signal as emitted by each of two or more information emission devices that each function as the given information emission device;

acquiring a difference between times indicated by the two or more information emission devices that each emitted the signal recorded in the two or more audio data; and relating, based on the difference, a single time axis to the two or more audio data.

13. The storage medium according to claim 12, wherein the processing further comprises:

detecting an audio event which is a predetermined type of sound as the another signal; and outputting information based on a result of identifying time at which the audio event is recorded by the identification processing.

14. The storage medium according to claim 13, wherein:

first audio data including the signal and second audio data including the signal are acquired; and the audio event that occurred at a same time in the first audio data and in the second audio data is detected.

15. The storage medium according to claim 13, wherein the given information emission device emits the signal at time that is set differently from predetermined time at which the audio event is likely to occur.

16. The storage medium according to claim 13, wherein a frequency of the signal is a frequency in a frequency band different from a predetermined frequency band of the audio event.

17. The storage medium according to claim 12, wherein
at least one audio data recording two or more signals
emitted by different information emission devices
among the plurality of information emission devices
are acquired, and the processing further comprises:

identifying a difference of internal time of the different
information emission devices based on the at least one
audio data; and relating, based on the difference, the single time axis to
the two or more audio data recording the signal from
one of the different information emission devices.

\* \* \* \* \*